United States Patent
Jakobsson et al.

(10) Patent No.: US 7,644,274 B1
(45) Date of Patent: Jan. 5, 2010

(54) METHODS OF PROTECTING AGAINST SPAM ELECTRONIC MAIL

(75) Inventors: Bjorn Markus Jakobsson, Hoboken, NJ (US); Joy Colette Mueller, Mainz (DE)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 590 days.

(21) Appl. No.: 09/538,663

(22) Filed: Mar. 30, 2000

(51) Int. Cl.
H04L 9/32 (2006.01)

(52) U.S. Cl. .................... 713/168; 709/206; 713/153; 713/155; 713/170

(58) Field of Classification Search .......... 705/39, 705/35; 709/206, 207, 203, 224, 225; 713/200, 713/168, 153, 155, 170
See application file for complete search history.

(56) References Cited

U.S. PATENT DOCUMENTS

| | | | | |
|---|---|---|---|---|
| 6,199,102 B1 * | 3/2001 | Cobb | ................ | 709/206 |
| 6,249,805 B1 * | 6/2001 | Fleming, III | ................ | 709/206 |
| 6,266,692 B1 * | 7/2001 | Greenstein | ................ | 709/206 |
| 6,421,709 B1 * | 7/2002 | McCormick et al. | ........ | 709/206 |
| 6,424,718 B1 * | 7/2002 | Holloway | ................ | 380/277 |
| 6,546,416 B1 * | 4/2003 | Kirsch | ................ | 709/206 |
| 6,640,301 B1 * | 10/2003 | Ng | ................ | 713/156 |
| 6,687,740 B1 * | 2/2004 | Gough et al. | ................ | 709/206 |
| 6,691,156 B1 * | 2/2004 | Drummond et al. | ........ | 709/206 |
| 6,694,436 B1 * | 2/2004 | Audebert | ................ | 726/9 |
| 6,697,842 B1 * | 2/2004 | Smith et al. | ................ | 709/206 |
| 7,188,358 B1 * | 3/2007 | Hisada et al. | ................ | 726/2 |
| 7,571,319 B2 * | 8/2009 | Gillum et al. | ................ | 713/168 |
| 2002/0016824 A1 * | 2/2002 | Leeds | ................ | 709/207 |
| 2003/0149726 A1 * | 8/2003 | Spear | ................ | 709/206 |

FOREIGN PATENT DOCUMENTS

JP 02000201168 A * 7/2000

OTHER PUBLICATIONS

Shapiro, Jim., & David Shapiro, Dr. Dobb's Journal. San Mateo: Dec. 1999. vol. 24, Iss. 12; p. 32, 6 pgs.*

* cited by examiner

*Primary Examiner*—Stefanos Karmis
(74) *Attorney, Agent, or Firm*—Ryan, Mason & Lewis, LLP

(57) ABSTRACT

Methods of preventing spam email in an email system include determining whether a sender of email to a receiver of email has paid a required setup price or cost to become a registered sender of email to the receiver. If it is determined that the sender has not paid the required setup cost, then the receiver can reject the sender's email to thereby eliminate the receipt of unwanted spam messages. In order to qualify as a registered sender, the sender undergoes a qualification scheme wherein it pays the required cost, which may be for example monetary or computationally related, and is assigned an encrypted key by the receiver which allows the sender to send to the receiver email authenticated using the unique key associated with the sender and receiver. The receiver has the option of accepting or rejecting email from a sender in this fashion and can change the required setup cost or requirement at any time to ensure that the sender does not try to corrupt the email system once registered.

17 Claims, 4 Drawing Sheets

METHODS OF PROTECTING AGAINST SPAM ELECTRONIC MAIL

BACKGROUND OF THE INVENTION

1. Field of the Invention

The present invention relates generally to methods for controlling incoming or received electronic mail (email). More specifically, the invention relates to methods for protecting against the receipt of unwanted or "spam" email in a telecommunication system.

2. Description of the Related Art

Email is becoming a crucial tool of daily life. However, a recent upswing in the amount of "spam", i.e. email broadcast advertisements, has caused both considerable congestion on the internet and great concern to internet users, particularly in light of how inexpensive and efficient spamming techniques have become and the ease with which spammers have been able to avoid having their outgoing email traffic filtered out by the intended recipients. The act of sending "junk email", i.e. the mass mailing of unsolicited email messages based on address lists collected from various sources to which receivers of email have supplied their addresses for other purposes, is called "spamming" and threatens to overwhelm the legitimate uses of email. Spammers avoid filtering by, for example, moving their originating locations from domain to domain or otherwise disguising themselves. Typically, the Standard Mail Transfer Protocol (SMTP) for internet email requires that all email messages contain a header that includes the sender's email address (a "source" address and/or "return" address) and the receiver's email address (a "destination" address). However, it is possible to give incorrect sender information and still have the email delivered. Therefore spammers can simply change the indicated source address and continue sending unwanted email if a certain receiver decides not to accept incoming email from a certain sender.

As more users rely on email for daily communication, classification of email has taken on added significance. Classification of email messages allows users to treat classes of email differently and the need for classification is growing due to the explosive growth of spamming techniques currently utilized and encountered. This explosive growth is undesirable and potentially dangerous since the reliance on email as a vital form of electronic communication has become so pervasive in society today that its interruption or misuse threatens to stymie all forms of business communication, health care provision, military exchange of information, and the like.

Attempts have been made to design email systems and protocols that will alleviate the problems introduced by and associated with spam email. For example, methods exist for categorizing email which allow unrequested email to be automatically erased without consuming any system resources or user time. However, the model of the spammer assumed by the methods of Gabber et al. is a rather cooperative spammer who is limited to acquiring email addresses of receivers of email by merely purchasing lists of email addresses or acquiring them from newsgroups and the like. Thus, should a spammer become more militant, i.e. devise new strategies of acquiring email addresses, it is likely that the methods taught by Gabber et al. will be ineffective to prevent spamming.

Other attempts to prevent unwanted email include filtering the email according to the sender's address and according to recognized message and subject keywords. However, this is inefficient and easily thwarted by adversaries who intentionally avoid particular keywords that are known to be blacklisted, and/or who camouflage certain blacklisted source addresses or domains. Another currently-employed solution is to use electronic mail channel identifiers wherein a receiver assigns a different channel to each known sender by giving each of them a unique email address at which to contact the receiver. In this scheme, incoming mail gets sorted or rejected according to the address to which it is sent and the sender from which they originate. Other related attempts to prevent spamming have also been employed, but all of these approaches fail to effectively prevent the militant spammer from sending junk email that reaches an intended recipient's in box.

As internet technologies become more sophisticated over time, so will the efforts and knowledge of spammers desiring to send their messages indiscriminately through all of cyberspace. It is envisioned that spammers will soon have the ability to control the communication media of interest and be capable of corrupting large numbers of email protocol participants. This will allow such abusers of email systems to corrupt the email systems with abandon for their own selfish motives, and to the general detriment of all users of the systems. It would be desirable if these untoward results could be avoided.

Accordingly, there is a long-felt, but unresolved, need in the art for methods of preventing militant spammers from corrupting email systems with unwanted, junk email. These methods should be versatile and easy to implement in current email systems. Furthermore, it would be desirable if these methods shifted the computational and bulk storage requirements of implementing such methods back onto the spammer so as to alleviate for the potential receiver of the spam email the expense of fighting off unwanted spam attacks. Such results have not heretofore been achieved in the art.

SUMMARY OF THE INVENTION

The aforementioned problems are solved, and long felt needs met, by methods provided in accordance with the present invention for preventing receipt of unwanted email sent by senders in a communication system. The inventive methods determine whether a sender is a registered sender of email to a particular recipient or receiver to which the sender desires to send email. A sender becomes a registered sender by paying a price which will allow the sender to become a registered sender to the receiver. The price may be a monetary price, or some other computationally related price which is a function of the reservation of system resources. It may simply involve to register with some facility that monitors spamming and only certifies non-spammers, and refuses to renew certification of know offenders. Users registering may have to pay a deposit that is only returned if they are not found to abuse system resources. All email to the particular receiver that originates from senders that are not registered senders to the particular receiver are then weeded out at a gateway of the receiver of the communication system. All other email that originates from registered senders of email to the particular receiver is passed to the particular receiver.

The methods of preventing spam email in accordance with the present invention are efficient and computationally non-intensive, thereby conserving the resources of the communication system. Moreover, the inventive methods provide authenticity verification of the email with very little extra computational costs. Additionally, the methods of the present invention achieve message privacy using standard encryption methods and successfully manage data transmission problems associated with sending sensitive information by email. Such features, benefits and advantages have not heretofore been achieved in the art.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals identify similar elements throughout the several views.

DETAILED DESCRIPTION OF THE PRESENTLY PREFERRED EMBODIMENTS

Figure 1:
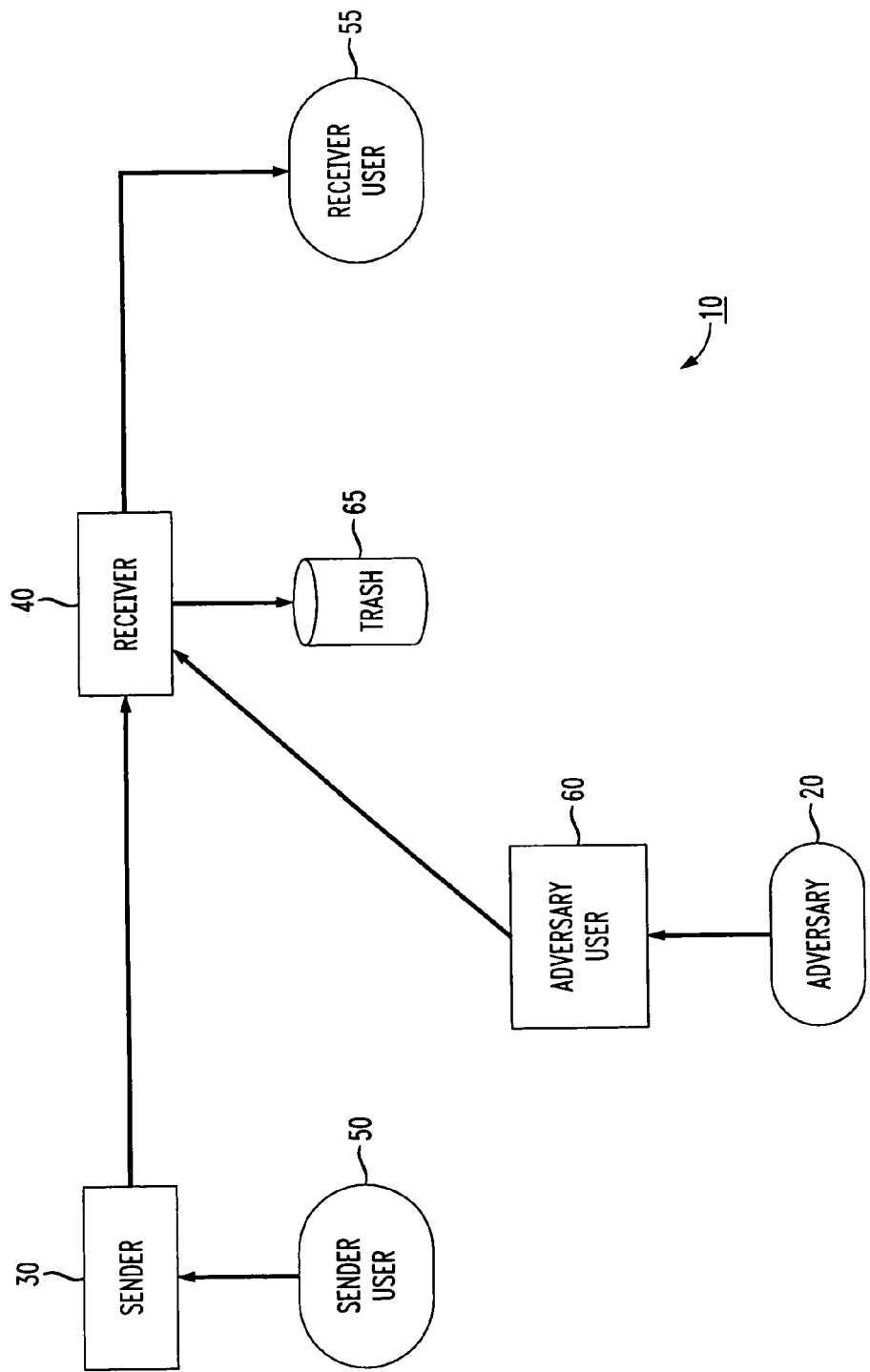
FIG. 1 is a block diagram of an email system for filtering spam in accordance with the present invention.

Referring now to the drawings, by way of preferred and illustrative example FIG. 1 depicts an email system 10 that can be corrupted by spam email, hereinafter referred to as "spam", by an adversary 20. Adversary 20 is any party that may corrupt a number of participants 30 in the email system 10. A participant 30 includes senders of email 40 and receivers of email 50. The senders 40 and receivers 50 may alternate these roles since each can both send and receive email in a typical email system. In accordance with the inventive methods, the senders 40 and receivers 50 can be modeled as a computational entity which in a preferred embodiment is a computer chip, smartcard, personal computer, laptop computer or any other device that has computational ability and can send or receive emails. These entities will simply be referred to as "computers" throughout.

When the computer operates on the email sent by the sender 30 or receiver 40 it is received and presented to a sender user 50 or receiver user 55 depending upon which user 50, 55 sent the email. Users 50, 55 with access to computers that correspond to sender 30 or receiver 40. In a preferred embodiment, for a user 50, 55 to be presented with an email M in accordance with the invention and with a label describing its sender 30 (or receiver 40 in the sending mode), M must first be accepted by the user 50, 55 after it is verified that the sender 30 has paid an applicable and required setup cost, price or fee as will be described in further detail below. Conversely in accordance with the inventive methods, for the receiver 40 to accept e-mail M from a sender 30, an entry describing the user sender must appear in a list of allowed or wanted senders 30 in a database that the receiver keeps. When a sender 30 appears on the list, a message authentication code (MAC) appended to the sender's M message will allow the message M to be received by receiver 40. This can be thought of as a secret password specific to the sender, receiver, and the sent email, and which only a sender who is registered can generate. More specifically, and as known in the art, a MAC is a keyed one-way function of an input wherein a secret key is known by both the generator and the verifier of the MAC. The validity of a MAC relies on knowing the secret key. MACs are known to those skilled in the art and have been utilized in the past to authenticate email messages. They have not been used to avoid spam or categorize incoming email. Descriptions of senders and users 30, 40 are added to this list by paying (or otherwise meeting) the associated setup costs, but may be removed from the list if the receiver 40 so decides. When this occurs, no more messages from sender 30 will be accepted by receiver 40.

It is envisioned that adversaries 20 and their computers 60 will become far more sophisticated in the near future and will thus have the ability to control a communication channel and therefore may remove or inject spam at will into the channel. Also, adversaries 20 may prepare a large number of messages before attempting a spam attack.

The goal of the adversary 20 is to make some k non-corrupted participants 30, denoted $R_1 \ldots R_k$, accept each message $M_1 \ldots M_k$ wherein these messages are chosen by adversary 20 without the adversary having to pay a total cost close to or exceeding (k–k')C, where k' is the number of the messages labeled as being sent by a participant 30 that has been corrupted and C is the setup cost. In simpler terms, he wants to send messages without paying the full fee. This formulation is denoted as a "spamming attack". Another goal of adversary 20 is to cause receiver 40 (or sender 30) to accept an email M and present it as originating from a non-corrupted sender S when, in fact, the e-mail M did not originate from S. Yet another goal of adversary 20 is to convince a non-corrupted participant that message M was sent by a non-corrupted sender S to some potentially corrupted receiver, thereby violating the sender's privacy. Finally, the adversary 20 wishes to determine whether a first message $M_1$ or a second message $M_2$ was sent between two non-corrupted participants, thereby violating the privacy of the message itself. The inventive methods herein disclosed advantageously thwart all of these goals of an adversary 20 with a minimum of computational expense.

In accordance with the inventive methods, an authentication mechanism for email is employed which can both validate and authenticate transmitted email. Preferably, a MAC based on a keyed cryptographic hash function h is used where the key is known only by the sender and the intended receiver (s). An adversary will not be able to determine whether a given string is a valid MAC on a given message m unless the adversary obtains access to the given key. This is true even after an arbitrary number of MACs for chosen messages other than m have been examined by the adversary.

Figure 2:
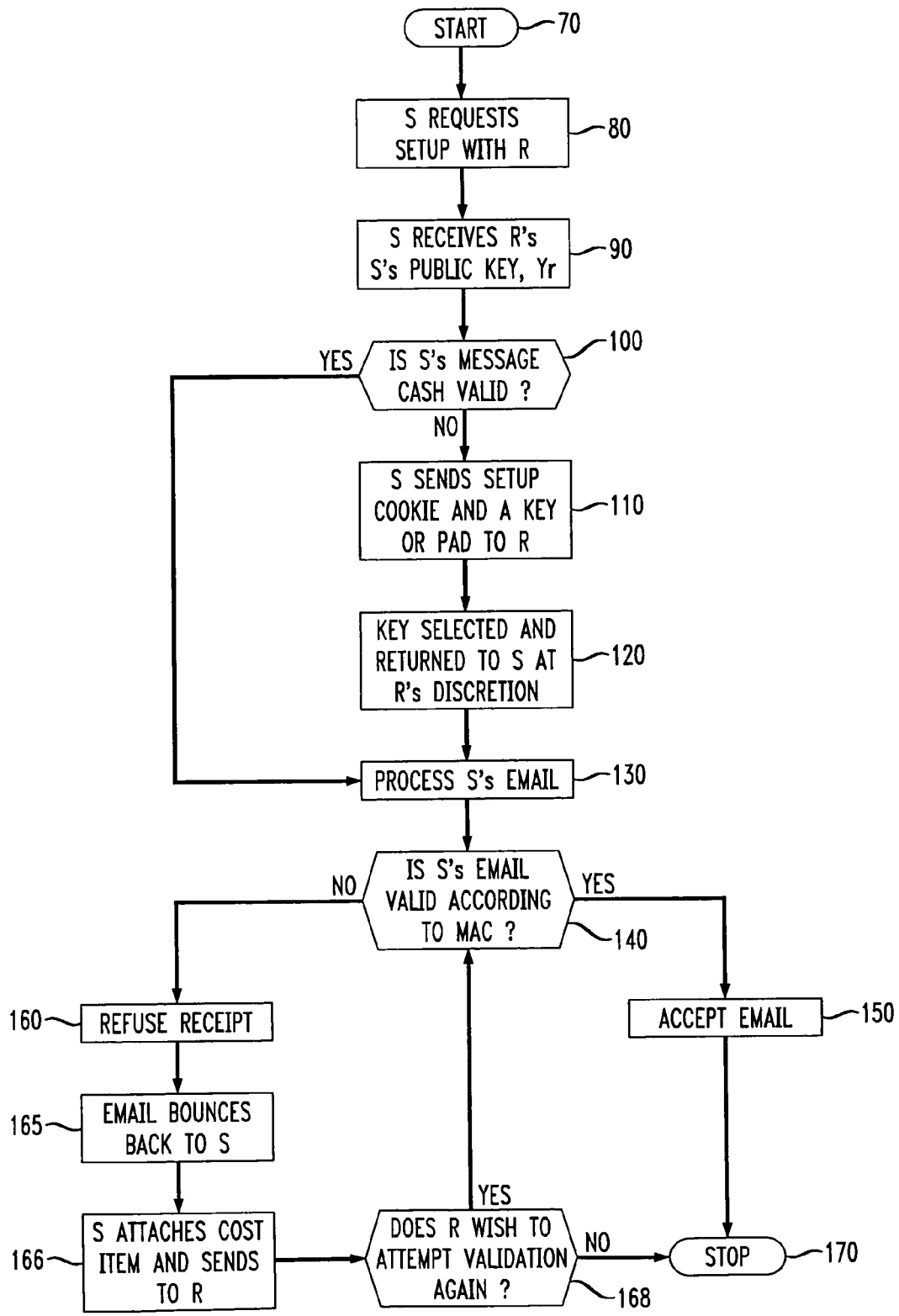
FIG. 2 is a flow chart of a preferred method of preventing the undesired receipt of spam email in accordance with the invention.

The methods of the present invention can be implemented by a software program that runs on a standard, general purpose digital computer associated with the email system of FIG. 1. Alternately, a software program embodying the inventive methods can be loaded or "burned" into a memory device such as a read-only memory (ROM) or programmable ROM (PROM) so that the methods can be executed therefrom. All such embodiments and equivalents thereof are within the intended scope of the present invention. Those skilled in the art will recognize that a server may be used to implement the software methods described herein and that the software to perform the methods may be placed in a ROM, EPROM or other memory device. The software may comprise separate modules to perform the required functions. Without respect to which of these methods is employed to execute the program, FIG. 2 depicts a preferred flow chart of the program flow of the inventive methods.

The method begins at step 70 and, at step 80, a request for email setup is initiated by a sender S. At step 90, S receives R's public key $y_R$ which is a public key encryption key. Any public key system that is secure against adaptive chosen message attacks (which is a description known to those skilled in the art) may be used, such for example as that described in R.

Rivest et al., "A Method for Obtaining Digital Signatures and Public-Key Cryptosystems," Communications of the ACM, v. 21, n. 2, pp. 120-126 (1978), the teachings of which are expressly incorporated herein by reference. Another preferred public key encryption method that may be used in the inventive methods is described in T. ElGamal, "A Public-Key Cryptosystem and a Signature Scheme Based on the Discrete Logarithm," Advances in Cryptology—Proceedings of Crypto'84, pp. 10-18 (1984), the teachings of which are also expressly incorporated herein by reference. At this point in the inventive methods, the email is not delivered, but is preferably bounced back to the sender with a return message, URL, homepage or ftp address from which the appropriate software to perform the remainder of the inventive method is obtainable or downloaded or downloadable. A "core address" is a standard email address known to those with skill in the art. An extended email address as taught by Gabber et al. is an email address with an extra field that is used to categorize emails and avoid spam. In a preferred embodiment, the extension is the MAC described above and can also be located in another portion of the email package sent over a network.

A "registration" process is then preferably implemented. At step 100 it is determined whether the email from sender S is "cash valid", that is whether the required setup cost has been paid or satisfied by sender S so that user receiver R can receive the email sent by sender S. If so, then the method proceeds to step 130 wherein the email is further processed as described hereinbelow. Otherwise, sender S sets up a "cookie" using a stream cipher generated pad P at step 110 and sends them to user receiver R so that user receiver R can decide whether it wishes to receive email from this particular sender S. A setup cookie is simply a message that provides evidence that an initiator of the cookie paid the required setup cost or that it will be possible to force sender S to pay the setup cost. The cookie can be for example a straight monetary amount, or a puzzle that sender S has solved in order to be allowed access to this particular receiver R. The stream cipher generated random sequence or "pad", P is preferably generated using a pseudorandom function that uses a keyed hash function h on an input that is a unique serial number, thereby encrypting the particular receiver R's email relationship with this particular sender S. While it has been found that a pseudorandom generator works efficiently for the inventive methods, other methods of generating identifiers may also be used. Alternately, instead of using a pad P as above in which the reply is encrypted, sender S may send the email encrypted using a public key as described above and as know in the art. In this modification, receiver R should sign the key using a digital signature method know in the art before sending it in order to avoid undetectable replacement of the public key by an adversary.

Receiver R then verifies the correctness of the cookie and, at step 120, selects a symmetric key, $K_{RS}$, uniformly at random from a set of possible keys at receiver R's disposal. Preferably, a symmetric key $K_{RS}$ and corresponding methods is used since such a key and such methods ensures privacy. A symmetric key and method of this nature is described in NBS FIPS Pub 46-1, "Data Encryption Standard," U.S. Department of Commerce (1988), the teachings of which are expressly incorporated herein by reference. Other schemes with similar functionality can be used as understood by these skilled in the art.

After the symmetric key is selected by receiver R, receiver R preferably adds redundancy to key $K_{RS}$ by replying to sender S using a public extension on receiver R's address appended solely for the purpose of setup. Sender S then computes key $K_{RS}$ and verifies that no errors occurred in the transmission of the setup protocol. Sender S then stores key $K_{RS}$ in a list of all such access keys, thereby allowing future emails from sender S to receiver R to be processed using this key.

In a preferred embodiment, key $K_{RS}$ can be generated by receiver R as $K_{RS}=h(K_R, s, i_s)$, where $K_R$ is receiver R's secret key, s is the sender's name and $i_s$ is a sequence number that is increased for each setup request by sender S. In order to ensure message privacy, the DES encryption standard is preferably used as is set forth in NBS FIPS PUB 81, "DES Modes of Operation," U.S. Department of Commerce (1995), the teachings of which are expressly incorporated herein by reference. In accordance with this standard, the secret key can be generated by S as $K_S=h(K_{RS}, count)$ where "count" is a counter increased for each message sent between sender S and receiver R. This key may be generated without any extra communication between sender S and receiver R. Registration is then completed. Below, it is assumed that registration has already been performed.

At step 130, the email m sent by sender S to receiver R is then processed. At step 140 it is determined whether the email m is valid according to a processed MAC. It is preferable to determine an extension e of receiver R's email address such that when this extension appears in the email, receiver R will accept the email. Letting p=hash(m), e is defined as MAC $K_{RS}(S)$. Receiver R then computes key $K_{RS}$ for the alleged senders of the email and calculates e. The email is accepted at step 150 if and only if the same extension of receiver R's address is the same as the result calculated for e. Otherwise the email is refused at step 160. Optionally, at step 165 the email is then bounced back to S and at step 166 S may attach the cost item and send it R. It may then be determined at step 168 whether R wishes to attempt validation again and if so the method then returns to step 140. Otherwise, the method stops at step 170. Alternately at step 140, instead of using an address extension, the MAC can be communicated in an available header of the email.

Figure 3:
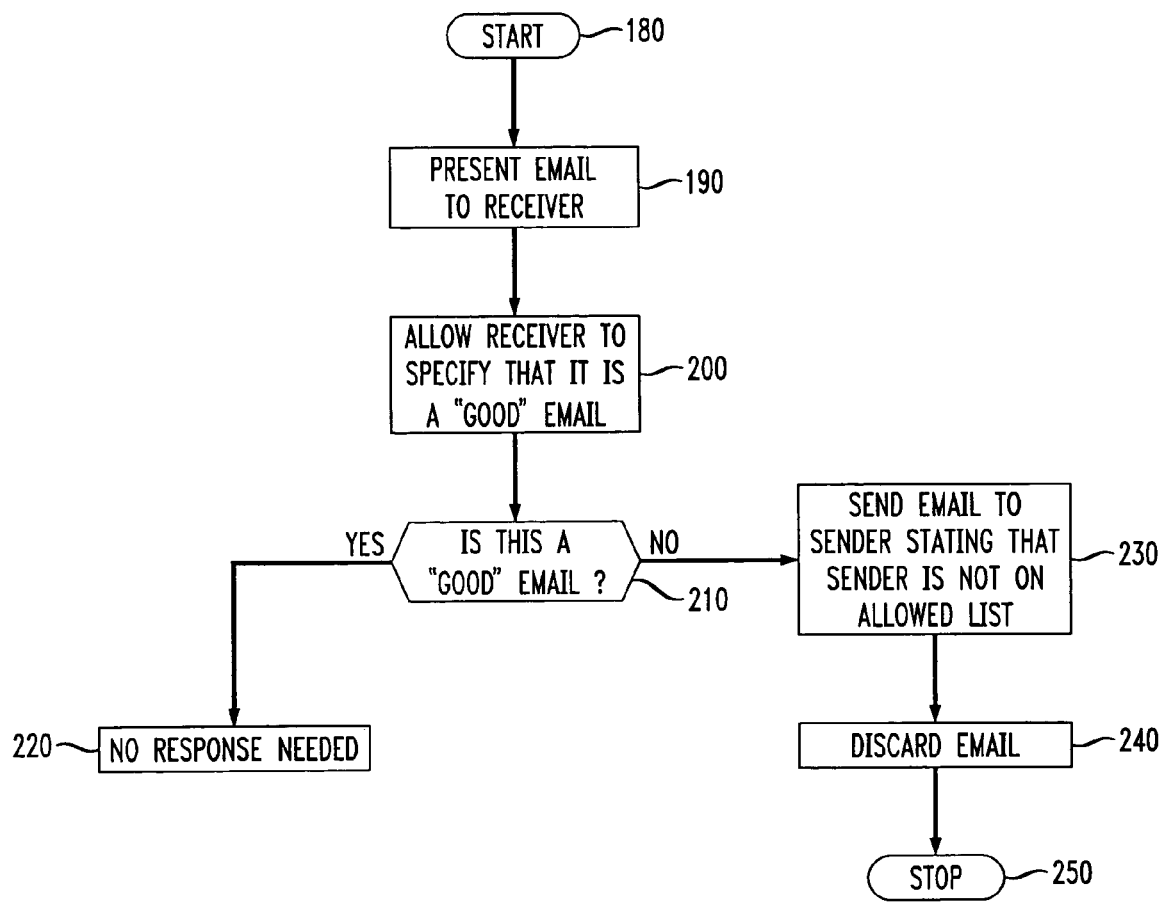
FIG. 3 is a flow chart of an alternate method of preventing undesired receipt of spam email.

FIG. 3 is a flow chart of an alternate embodiment of preventing spam. This method starts at step 180 and at step 190 the email is presented to a receiver. At step 200, the receiver specifies whether this is a "good" email, i.e. one that is received from an allowed sender. This is determined at step 210 and if it is a good mail, the response is needed at step 220. However, if it is not a "good" email at step 230 the receiver may send email to the sender stating that the sender is not on the allowed list. At this point the registration process described above, or an alternative to such a registration process may ensue, or the email may be discarded at step 240. The method would then stop at step 250.

Figure 4:
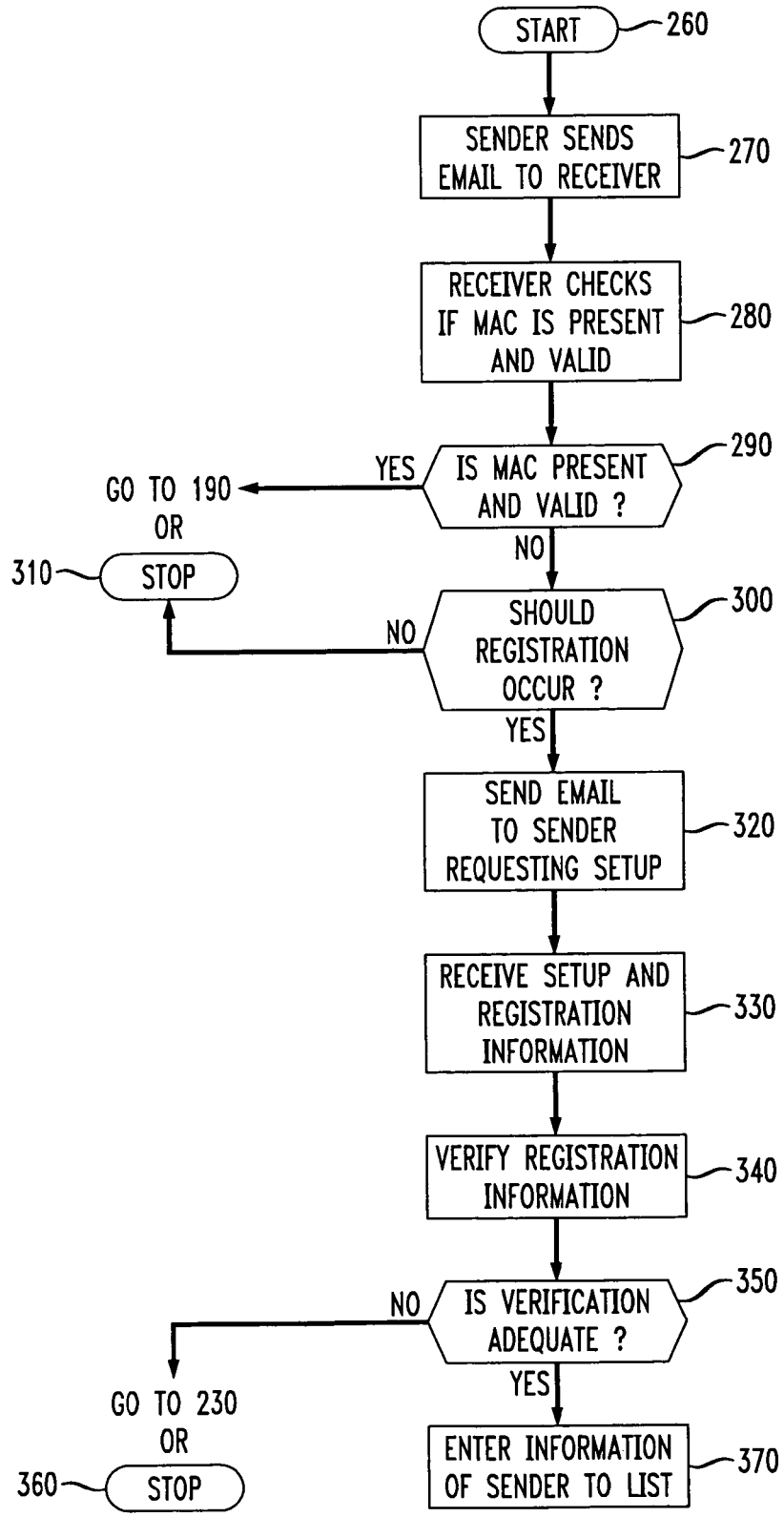
FIG. 4 is a flow chart of yet a further alternate method of preventing undesired receipt of spam email in accordance with the invention.

FIG. 4 depicts yet a further preferred embodiment of a method for preventing spamming in accordance with the invention. The method begins at step 260 and at step 270, the sender sends email to a receiver. At step 280, the receiver checks if a MAC is present and valid. It is determined at step 290 whether the MAC is present and valid and if so, the method may stop or go to step 190 (FIG. 3) where the verification procedure occurs. If not, then at step 300 it is determined whether registration as described above should occur. If not, then the method stops at step 310. If so, then at step 320 the receiver may send an email to the sender requesting setup. At step 330, the setup and registration and setup information is received. Then, at step 340 the registration information is verified.

It is then preferably determined at step 350 whether the verification is adequate. If not, then the method may return to step 230 (FIG. 3) or may stop at step 360. If so, then at step 370 the information is entered on the list and this sender is now authorized to send emails to the receiver. The method then stops.

The inventive methods are thus effective to ensure that unwanted spam does not corrupt a participant in an email system. The methods also ensure that the system does not become clogged with superfluous emails that could endanger the system's integrity and even shut the system down. The inventive techniques may also be utilized as a message categorizer wherein all incoming emails are sorted according to sender and receiver specific categories. In this fashion, a sender may request a higher or lower priority by indicating this in a field that gets authenticated along with the message. The methods of the present invention are computationally inexpensive and quickly implementable in existing email systems. Moreover, these methods cannot be easily overcome by even the most sophisticated of adversaries determined to blanket the system with spam. Such results have not heretofore been achieved in the art.

While there have been shown and described certain fundamental novel features of the present invention as applied to preferred embodiments thereof, it will be understood by those skilled in the art that various omissions and substitutions and changes in the methods described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

We claim:

1. A computer-implemented method for preventing receipt by receivers of unwanted electronic mail messages (email) sent by senders in a communication system, comprising the steps of:

determining whether email to a particular receiver comprises valid message authentication code (MAC) information;

filtering out at a gateway of the communication system email directed to the particular receiver that does not comprise valid MAC information;

providing the particular receiver with email directed to the particular receiver that comprises valid MAC information;

determining if a particular sender is a registered sender of email to the particular receiver, wherein the particular sender becomes a registered sender by satisfying a requirement; and registering the particular sender when the particular sender is determined not to be a registered sender of email to the particular receiver;

wherein the step of registering the particular sender comprises the steps of:

establishing by the particular sender a cookie which indicates to the particular receiver whether the particular sender has satisfied the requirement to allow the particular sender to become a registered sender to the particular receiver;

establishing an address related to an address associated with the particular receiver which will inform the particular sender that the particular receiver desires that the particular sender be able to send email to the particular receiver; and establishing by the particular receiver a key which is forwarded to the particular sender by the particular receiver to inform the particular sender that the particular sender is authorized to send email to the particular receiver and is now a registered sender and for use by the particular sender whenever the particular sender wishes to send email to the particular receiver;

wherein said step of establishing the address comprises generating a pseudorandom function with a keyed hash function using an input number comprising a unique serial number for use in generating an identifier for email between the particular sender to the particular receiver;

wherein each of said steps is performed by one or more computers.

2. The method recited in claim 1, wherein said step of establishing an address comprises sending email from the particular receiver to the particular sender using public key encryption.

3. The method recited in claim 1, wherein said registering step further comprises sending to the particular user by the particular receiver, an encrypted key wherein the encrypted key is a member of a set of encrypted keys.

4. The method recited in claim 3, further comprising the step of storing the encrypted key by the particular sender in a table of encrypted keys for use by the particular sender whenever the particular sender desires to send email to the particular receiver.

5. The method recited in claim 1, wherein the step of determining whether email comprises valid MAC information comprises comparing the MAC against a value determined by the particular receiver.

6. The method recited in claim 1, wherein the step of determining whether email comprises valid MAC information comprises comparing the MAC to an available header in an address of the particular receiver, in the received email message, whereby the MAC is not a valid MAC if the MAC and the header are not identical.

7. A computer system for preventing receipt by receivers of unwanted electronic mail messages (email) sent by senders in a communication system, comprising:

a memory device for storing a plurality of modules; and at least one server computer configured to implement said plurality of modules;

said plurality of modules comprising:

a determining module for determining whether email to a particular receiver comprises valid message authentication code (MAC) information;

a filtering module for filtering out at a gateway of the communication system email directed to the particular receiver that does not comprise valid MAC information;

a provisioning module for providing the particular receiver with email directed to the particular receiver that comprises valid MAC information; and a registering module for determining if a particular sender is a registered sender of email to the particular receiver, wherein the particular sender becomes a registered sender by satisfying a requirement;

wherein the registering module is also for registering the particular sender when the particular sender is determined not to be a registered sender of email to the particular receiver; and wherein said registering module further comprises a generator for generating a pseudorandom function with a keyed hash function using an input number comprising a unique serial number for use in generating an identifier for email between the particular sender to the particular receiver.

8. The system recited in claim 7, wherein said registering module sets up an encrypted address for sending email from the particular receiver to the particular sender using public key encryption.

9. The system recited in claim 7, wherein said registering module sends to the particular user by the particular receiver, an encrypted key wherein the encrypted key is a member of a set of encrypted keys.

10. The system recited in claim 7, wherein said filtering module compares the MAC against a value.

11. The system recited in claim 10, wherein the filtering module compares the MAC to an available header in an address of the particular receiver, in the received email message, whereby the MAC is not a valid MAC if the MAC and the header are not identical.

12. A computer readable medium having instructions stored thereon, which when executed by a computer cause the computer to prevent receipt by receivers of unwanted electronic mail messages (email) sent by senders in a communication system, by the steps of:
   determining whether email to a particular receiver comprises valid message authentication code (MAC) information;
   filtering out at a gateway of the communication system email directed to the particular receiver that does not comprise valid MAC information;
   providing the particular receiver with email directed to the particular receiver that comprises valid MAC information;
   determining if a particular sender is a registered sender of email to the particular receiver, wherein the particular sender becomes a registered sender by satisfying a requirement; and
   registering the particular sender when the particular sender is determined not to be a registered sender of email to the particular receiver;
   wherein the step of registering the particular sender comprises the steps of:
   establishing by the particular sender a cookie which indicates to the particular receiver whether the particular sender has satisfied the requirement to allow the particular sender to become a registered sender to the particular receiver;
   establishing an address related to an address associated with the particular receiver which will inform the particular sender that the particular receiver desires that the particular sender be able to send email to the particular receiver; and
   establishing by the particular receiver a key which is forwarded to the particular sender by the particular receiver to inform the particular sender that the particular sender is authorized to send email to the particular receiver and is now a registered sender and for use by the particular sender whenever the particular sender wishes to send email to the particular receiver;
   wherein said step of establishing the address comprises generating a pseudorandom function with a keyed hash function using an input number comprising a unique serial number
   for use in generating an identifier for email between the particular sender to the particular receiver.

13. The medium recited in claim 12, wherein said step of establishing an address comprises sending email from the particular receiver to the particular sender using public key encryption.

14. The medium recited in claim 12, wherein said registering step further comprises sending to the particular user by the particular receiver, an encrypted key wherein the encrypted key is a member of a set of encrypted keys.

15. The medium recited in claim 14, further comprising the step of storing the encrypted key by the particular sender in a table of encrypted keys for use by the particular sender whenever the particular sender desires to send email to the particular receiver.

16. The method recited in claim 12, wherein the step of determining whether email comprises valid MAC information comprises comparing the MAC against a value determined by the particular receiver.

17. The medium recited in claim 12, wherein the step of determining whether email comprises valid MAC information comprises comparing the MAC to an available header in an address of the particular receiver, in the received email message, whereby the MAC is not a valid MAC if the MAC and the header are not identical.

* * * * *